3,392,195
AMINO ACID DERIVATIVES
Alexander Galat, 126 Buckingham Road,
Yonkers, N.Y. 10701
No Drawing. Filed Sept. 9, 1963, Ser. No. 307,344
8 Claims. (Cl. 260—518)

This invention deals with new and novel chemical compounds, derivatives of amino acids, which can be represented by the type formula:

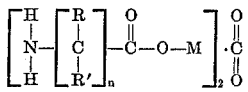

where:
R is a radical selected from the group consisting of hydrogen, aliphatic and aromatic radicals,
R' also is a radical selected from the group consisting of hydrogen, aliphatic and aromatic radicals, and which may be the same as or different from R,
$n$ is a whole number from 1 to 10, and
M is an alkali metal such as lithium, sodium or potassium.

As a specific and illustrative but non-limiting embodiment of this invention, when glycine (aminoacetic acid) is the amino acid and M is sodium, the new and novel compound of this invention can be represented as:

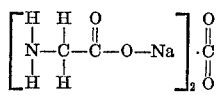

A principal object of this invention is to provide new and novel amino acid derivatives.

Another object of this invention is to provide new and novel amino acid derivatives useful as components of certain pharmaceutical formulations.

A further object of this invention is to provide sodium glycine carbonate.

Additional object of this invention will become evident as the description thereof proceeds.

The new and novel compounds of this invention are characterized by high solubility in water, anhydrous character, stability on exposure to air (e.g., non-hygroscopicity), lack of toxicity and a mildly alkaline reaction. These, and several other important characteristics which are discussed below, make these compounds very valuable for use in certain pharmaceutical formulations.

The new and novel compounds of this invention may be prepared in practically quantitative yields by reacting an amino acid with an alkali metal carbonate or bicarbonate. Employing glycine and either sodium carbonate or sodium bicarbonate as illustrative but non-limiting examples of reactants, the preparative processes proceed in accordance with the following equations:

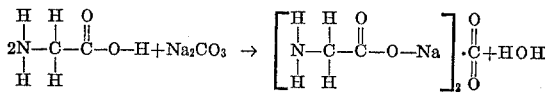

and

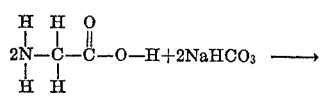

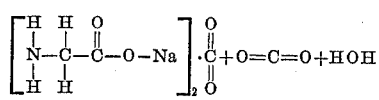

The following examples illustrate the preparation of the compounds of this invention:

Example 1.—One mole (75 g.) of glycine, 53 g. (0.5 mole) of sodium carbonate and 100 ml. of water were brought to the boiling point, the mixture was allowed to cool to 50° C. and treated with 500 ml. of methanol. The resulting precipitate was filtered, washed with methanol and dried. The product weighed 110 g. (92.5% of theory).

Example 2.—One mole (75 g.) glycine, 84 g. (1.0 mole) of sodium bicarbonate and 100 ml. water were heated on a boiling water bath until the evolution of carbon dioxide ceased. To the resulting mixture was added 500 ml. of methanol, the precipitate formed was separated by filtration, washed with methanol and dried. The product weighed 115 g. (96.7% of theory).

The product obtained from both of the above procedures was a white powder, extremely soluble in water, stable in air, non-hygroscopic and having a pH of 8.3–8.5 in aqueous solution. The nitrogen content of the product was 11.48%, in close agreement with the calculated nitrogen content of 11.75%.

The equivalent molecular weight of the product was determined as follows: an accurately weighed sample (0.2020 g.) of the product was dissolved in 5 ml. of water and treated with 25 ml. of 0.1 N hydrochloric acid. The resulting acidic solution was boiled to remove carbon dioxide and the excess hydrochloric acid was titrated with 0.1 N sodium hydroxide, using methyl orange as the indicator. Eight ml. of the standard alkali were required. The amount of 0.1 N acid consumed by the sample was thus 17 ml. and the equivalent molecular weight of the compound is accordingly $$\frac{0.2020 \times 10 \times 1000}{17}$$

or 118.6, a figure very close to the theoretical equivalent weight of 119.

Amino acids other than glycine can be used with similar results, for example alpha alanine, beta alanine, valine, leucine, phenylalanine, epsilon aminocaproic acid, et cetera. In general the reaction proceeds in the same manner as previously described in connection with glycine but minor variations may advantageously be employed in certain instances for the isolation of the product. Thus for example, when employing beta alanine or epsilon aminocaproic acid it has been found more advantageous to employ isopropanol or a mixture of isopropanol and methanol (instead of straight methanol) to accomplish a more nearly complete precipitation of the reaction product. In all instances the yield of the new and novel amino acid derivatives of this invention is in excess of 90% of theory.

Lithium and potassium carbonates or bicarbonates react with the same ease as the corresponding sodium salts to give the lithium and potassium derivatives of amino acids.

The chemical structure of the compounds of this invention may be represented in several ways. For example, in the simple case of glycine and sodium the following structures may be written:

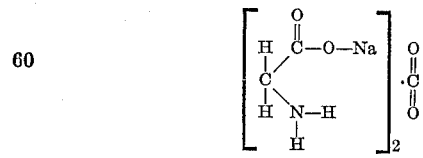

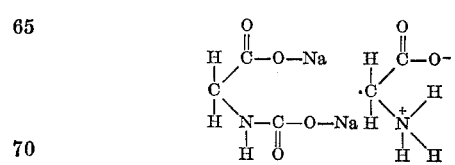

and:

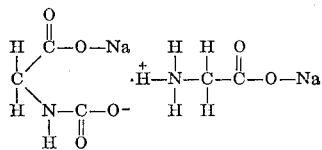

For convenience and simplicity in exposition the first of the above three structures will be used in this presentation and the new and novel compounds will be designated "metal amino acid carbonates." Thus in the above (glycine and sodium) the compound will be designated "sodium glycine carbonate."

The new and novel compounds of this invention are useful as components of various medicinal preparations. They are valuable as gastric antacids, gastic buffering agents, neutralizing and alkalizing agents, solubilizers for sparingly soluble acidic drugs and as a source of carbon dioxide in effervescent compositions and the like. Because of its lack of toxicity, low cost and other favorable characteristics, the most useful member of this group of new and novel compounds is sodium glycine carbonate. Accordingly, this compound will be employed in the following detailed discussion of the properties and uses of the new and novel amino acid derivatives of this invention.

The sodium salt of glycine,

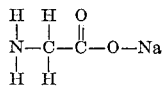

(sodium glycinate) is of course known. Also, the compound sodium carbamino glycinate, is known,

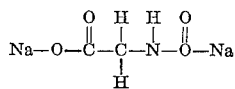

However, both of this compounds are characterized by a strongly alkaline character (pH 9.5–11.0), a strongly irritating effect on tissues and hygroscopicity. Consequently neither of these compounds has received any application in the formulation of pharmaceutical preparations.

In contrast, as already mentioned, the new and novel compounds of the present invention are only mildly alkaline (pH 8.3–8.5), are non-hygroscopic and air stable and accordingly are well suited for a number of applications and particularly for medicinal uses such as mentioned above.

In the past sodium bicarbonate has been employed to accomplish many of the objects for which the new compounds of the present invention are ideally suited. Sodium bicarbonate also is non-hygroscopic, mildly alkaline (pH ca. 8.5), is an effective gastric antacid, neutralizing and solubilizing agent and a source of carbon dioxide in effervescent preparations. However, sodium bicarbonate suffers from a number of well known disadvantages. Thus, for many uses sodium bicarbonate is not sufficiently soluble in water, its solubility being only about 10 g. per 100 ml. water at ordinary room temperature. This already low solubility is further depressed if other sodium ions are present. As a result, many effervescent formulations leave an undissolved residue of sodium bicarbonate when insufficient water is employed in their preparation.

In contrast, the solubility of sodium glycine carbonate is about 70 g. per 100 ml. of water which is amply high for all practical purposes.

Further, sodium bicarbonate is sensitive to temperatures above 20–25° C. In the range of 50–100° C. the decomposition of sodium bicarbonate is rapid and can be observed readily, for example, by warming the dry powder in a flask connected to a bubble counter. Solutions of sodium bicarbonate are similarly unstable at even moderately elevated temperatures and this decomposition can be easily followed by observing the evolution of carbon dioxide therefrom. Decomposition of solutions of sodium bicarbonate takes place even at room temperature as evidenced by a steady rise in the pH of the solution. As is well known, decomposition of sodium bicarbonate produces sodium carbonate, carbon dioxide and water. The formation of sodium carbonate on decomposition results in an often undesirable rise in alkalinity and hygroscopicity, while the formation of water is frequently detrimental, particularly when ingredients sensitive to moisture are present.

On the other hand, the compounds of this invention, for example sodium glycine carbonate, are extremely stable to heat and show no loss of carbon dioxide even on prolonged heating at 100° C. In addition, since these compounds are carbonates (rather than bicarbonates) they do not evolve water on heating, again in contrast to the behaviour of sodium bicarbonate.

A further very important difference between sodium bicarbonate and sodium glycine carbonate is in their respective reactions with acids. Thus, while the former on reacting with acid forms water as one of the reaction products, sodium glycine carbonate reacts with acids without formation of water. This difference in behavior is shown by the following model equations, HX being employed to represent an acid.

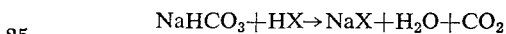

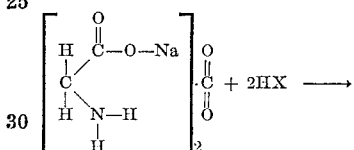

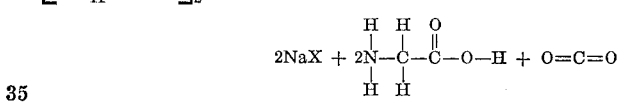

This formation of water during the reaction of sodium bicarbonate with acids is extremely detrimental when this compound is used in the preparation of effervescent compositions. As is well known such compositions comprise suitable non-toxic organic acid, usually tartaric or citric acid, and sodium bicarbonate. As long as such compositions remain perfectly dry and are stored in a relatively cool place, they are reasonably stable. However, even a small amount of moisture, which may be introduced during the manufacture of the product or which may be produced if the product is stored at only a moderately elevated temperature or which may be absorbed when the mixture is left open in the air, may act as a catalyst and cause the decomposition of an appreciable portion of or the entire amount of the mixture. This is due to the fact that a small amount of moisture is enough to initiate the reaction between the acid and the sodium bicarbonate, which in turn liberates additional amounts of water. Thus, in a sense, water may be considered to act auto-catalytically and the extent of decomposition of such mixtures is not proportional to the amount of moisture that triggers the decomposition.

In contrast, as seen from the second of the above chemical equations, the compounds of this invention, such as sodium glycine carbonate, do not form water when they interact with acids and consequently effervescent mixtures comprising a compound of this invention and an acid such as citric or tartaric are very stable.

Compounds of this invention, particularly sodium glycine carbonate, are useful as gastric antacids. In this application they combine an initial high and rapid acid neutralizing effect with a prolonged buffering activity. The latter is due to the formation of amino acids when compounds of this invention interact with acids. (See the second of the above chemical equations, HX representing hydrochloric acid of the stomach.) Glycine is well known as an excellent gastric buffering agent. As can be seen from the equation, one molecule of this amino acid is liberated by sodium glycine carbonate concurrently with the neutralization of one molecule of hydrochloric acid.

Thus, sodium glycine carbonate combines an initial rapid action with a desirable prolonged buffering effect. The liberation of carbon dioxide also has a beneficial effect in that it provides a carminative action, is soothing and its expulsion relieves distension.

Compounds of this invention are also useful as solubilizing agents for sparingly soluble drugs of acidic character. Of the latter, acetylsalicylic acid (aspirin) is of particular importance. It has long been known that acetylsalicylic acid is much more effective and is safer when administered in the form of a water soluble salt. When administered in this form the onset of the analgesic and antipyretic action is much more rapid, the serum levels are higher and the effect is more prolonged than with free acetylsalicylic acid. In addition gastric intolerance, very commonly observed with acetylsalicylic acid, is eliminated when the drug is administered in the form of its soluble salts. This intolerance to free acetylsalicylic acid, which may range from mild upsets to severe hemorrhagic gastritis, is the most serious side-effect of this very important drug. Studies performed in conjunction with gastroectomy and gastroscopy have shown insoluble particles of acetylsalicylic acid imbedded between rugae. Reactions varying from hyperemia to erosive gastritis have been reported to occur in areas immediately about these adherent particles. Obviously, such difficulties are avoided if the drug is administered as a solution of a soluble salt thereof.

In the past, one method of solubilizing acetylsalicylic acid was to administer it as a mixture with sodium bicarbonate. On contact with water the two components of this mixture interact to produce the soluble sodium salt of acetylsalicylic acid, carbon dioxide and water. However, as mentioned previously, mixtures of acids and sodium bicarbonate are very sensitive to moisture. The latter acts as a catalyst which initiates reaction between the acid and bicarbonate and the reaction produces additional amounts of water, resulting eventually in extensive decomposition.

With simple effervescent mixtures, such as citric acid and sodium bicarbonate, the consequence of such a premature interaction of the compounds contained in the mixture is relatively harmless in that the mixture merely becomes ineffective as an effervescent product. The situation, however, is much more serious when the acid component of the mixture is acetylsalicylic acid. Obviously this compound should be present at all times in full therapeutic amount and in a high degree of purity, so that its analgesic and antipyretic activity may remain standard, consistent and dependable. However, as is well known, acetylsalicylic acid and its salts are extremely sensitive to moisture, which causes hydrolysis of the compound with formation of a corrosive and less active mixture of salicylic acid and acetic acid.

In contrast, sodium glycine carbonate, for example, reacts with acetylsalicylic acid to produce only the sodium salt of this acid, carbon dioxide and glycine. See the second equation above, HX representing acetylsalicylic acid. Both carbon dioxide and glycine are inert as far as their action on acetylsalicylic acid or its salts is concerned. Since there is no formation of water in this reaction there is no possibility of hydrolytic decomposition of a mixture of acetylsalicylic acid and sodium glycine carbonate.

While water produced by the interaction of acetylsalicylic acid and sodium bicarbonate is very detrimental, glycine resulting from the interaction of this acid with sodium glycine carbonate is very valuable since it possesses a useful buffering effect, thus providing additional protection of the gastric mucosa against irritation.

Another interesting, useful and unexpected property of the compounds of my invention is that they are readily compressible which greatly facilitates the preparation of tablets from dry mixtures containing them. This ready compressibility is in contrast to compounds such as sodium bicarbonate which cannot be compressed and require elaborate procedures before they can be formed into tablets.

Be it remembered that while this invention has been described in connection with specific details and specific embodiments thereof, these details and embodiments are illustrative only and are not to be considered limitations on the spirit and scope of said invention except in so far as these may be incorporated in the appended claims.

I claim:

1. Alkali metal amino acid carbonates produced by the interaction in aqueous medium at the boiling point of one atom equivalent of an alkali metal introduced as a compound selected from the group consisting of alkali metal carbonates and alkali metal bicarbonates with one molecular equivalent of an amino acid of the formula:

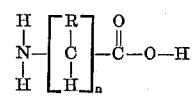

where:
R is selected from the group consisting of hydrogen, methyl, ethyl, isobutyl and benzyl radicals, and
$n$ is a whole number from 1 to 10.

2. Alkali metal amino acid carbonates produced by the process of claim 1 in which R represents hydrogen and $n$ is a whole number from 1 to 5.

3. Alkali metal amino acid carbonates produced by the process of claim 1 in which the amino acid reactant is alanine.

4. Alkali metal amino acid carbonates produced by the process of claim 1 in which the amino acid reactant is phenyl alanine.

5. Alkali metal amino acid carbonates produced by the process of claim 1 in which the amino acid reactant is valine.

6. Alkali metal amino acid carbonates produced by the process of claim 1 in which the amino acid reactant is leucine.

7. Alkali metal amino acid carbonates produced by the process of claim 1 in which the amino acid is glycine.

8. Alkali metal amino acid carbonates produced by the process of claim 1 in which the amino acid reactant is glycine and the alkali metal is sodium.

References Cited

UNITED STATES PATENTS

| 2,463,963 | 3/1949 | Gorcica | 260—534 |
| 2,574,510 | 11/1951 | Thurston et al. | 260—501 |
| 3,131,221 | 4/1964 | Remes et al. | 260—501 XR |
| 2,429,569 | 10/1947 | Abramson | 167—55 |
| 3,208,906 | 9/1965 | Beekman | 167—55 |

FOREIGN PATENTS

| 518,145 | 3/1955 | Italy. |
| 1,233,267 | 10/1960 | France. |

OTHER REFERENCES

Giustina et al., Societa Italiana di Biologia Sperimentale Bollettino, vol. 28 (1952), pp. 691–692.

LORRAINE A. WEINBERGER, *Primary Examiner.*

DANIEL D. HORWITZ, *Examiner.*

A. P. HALLUIN, *Assistant Examiner.*